GASKET SEAL FOR LATERALLY ADJUSTABLE JOINTS
Filed Nov. 1, 1947
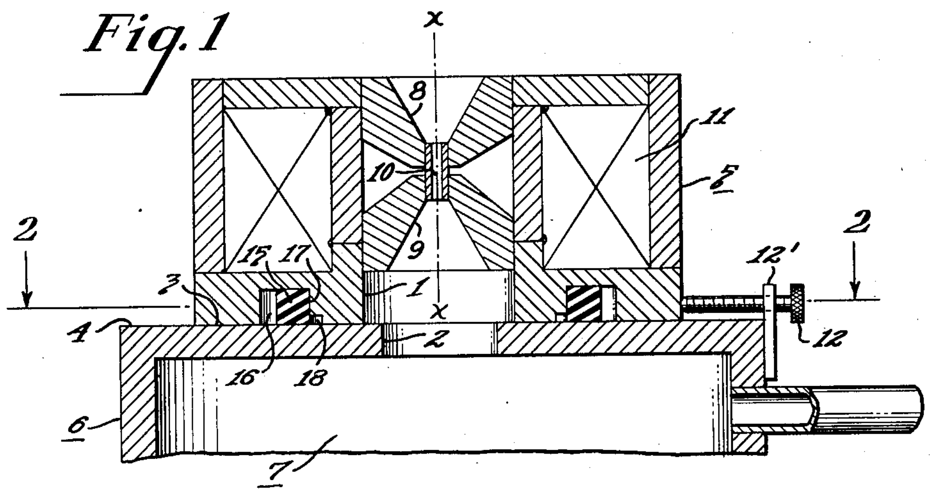
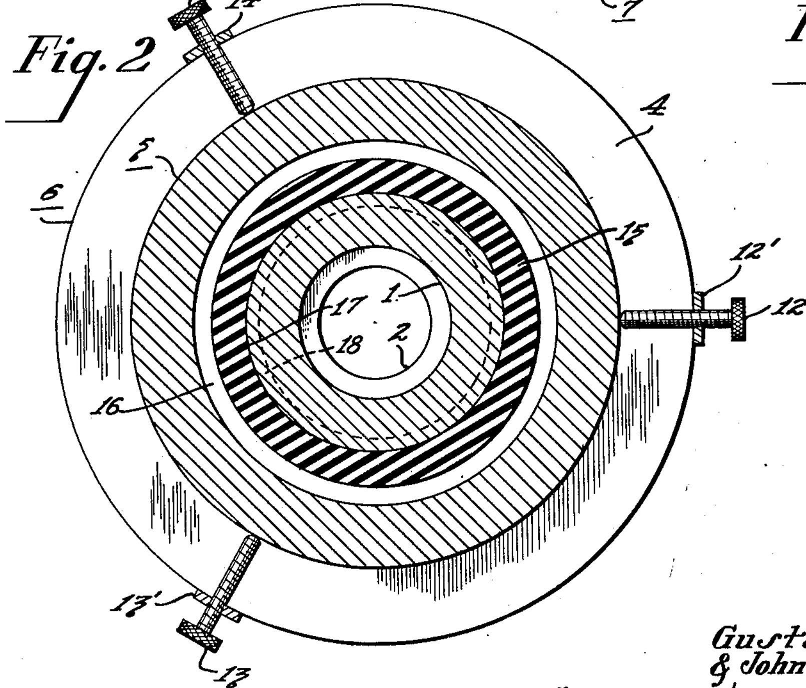
Inventor
Gustav F. Burger
& John H. Reisner
By
Morris B. Rabkin
Attorney Patented Aug. 18, 1953 2,649,313

UNITED STATES PATENT OFFICE 2,649,313

GASKET SEAL FOR LATERALLY ADJUSTABLE JOINTS

Gustav F. Burger, Camden, and John H. Reisner, Collingswood, N. J., assignors to Radio Corporation of America, a corporation of Delaware Application November 1, 1947, Serial No. 783,496

1 Claim. (Cl. 285—1)

This invention relates to gasket-type seals, particularly to improvements in gasket seals for vacuum-plumbing systems and, while not limited thereto, will be described as applied to the solution of a problem encountered in the construction and operation of electron-microscopes and other high-vacuum apparatus of the type wherein the conduits or compartments which the gasket is designed to seal are normally subjected to relative movement, for example, for the purpose of aligning the axes of the said conduits or the contents of one compartment with respect to the contents of the other or others.

In making a rigid vacuum-tight seal between two conduits it is common practice to provide a groove in one or both of the abutting conduit-faces for accommodating a yieldable gasket, and to compress the gasket by the application to the assembly of a clamping force supplied by screws, bolts or other mechanical fixtures. Such auxiliary clamps, however, cannot be employed in plumbing systems wherein the evacuable conduits or compartments are normally subject to any substantial degree of movement with respect to each other. By way of example, a rigid gasket seal cannot ordinarily be employed in an electron-microscope wherein the chamber which contains the electron-emissive cathode (or one containing an electron-lens) and the chamber which contains the target upon which the electrons impinge, must be subjected to more or less frequent relative movement for the purpose of aligning the axis of the electron beam with respect to the target.

It might appear that a satisfactory adjustable gasket-type seal could be achieved by omitting the mechanical clamping elements between such chambers or conduits and relying upon the atmospheric pressure on the assembly (and, also, the weight of the upper compartment upon the lower one) as the source of the compression force upon the yieldable gasket material. The trouble with such a seal would be that the adjusting force required in the alignment of the conduit-sections subjects the yieldable gasket material to lateral distortion and the laterally distorted material becomes wedged between the normally contiguous end-faces of the conduits. As a result, the parts may become separated a distance sufficient to destroy the vacuum, or the wedged-in gasket material may jam the adjusting movement. Thus, the trend in the art has been away from gasket-type seals, and the practice has been to employ bellows-type seals wherever relative movement of the conduit sections is desired.

Accordingly, the principal object of the present invention is to provide a new and improved gasket-type vacuum-tight seal and one which may be employed for sealing vacuum conduits or chambers wherein the parts to be sealed are normally subjected to relative movement.

Another and related object of the present invention is to provide an improved method of and apparatus for compensating for the distortion of the yieldable gasket material caused by the application thereto of the lateral forces required to produce relative movement of the parts which the gasket is designed to seal.

Other objects and advantages will be apparent and the invention itself will be best understood upon reference to the following specification and to the accompanying drawing, wherein:

Fig. 1 is a vertical section and Fig. 2 is a plan view looking in the direction of the arrows 2—2 of Fig. 1, of the improved gasket seal of the invention as applied to an electron-optical instrument having two relatively movable conduits, the gasket being interposed between said conduits and the axes of the conduits in register, and Fig. 3 is a view similar to Fig. 1 but showing the conduits moved out of alignment and illustrating the effect of such movement upon the yieldable gasket material.

In the parts of an electron microscope shown in the drawing, 1 and 2 designate the inner walls and 3 and 4 the contiguous end-faces of two laterally movable sections 5 and 6 of a conduit having a vertical axis $x$—$x$ along which electrons travel from an upper source (not shown) to a lower target (not shown) in the main chamber 7 of the instrument. The upper section 5 of this bi-part conduit contains the pole pieces 8 and 9 and the central apertured element 10 of an electron lens which receives its flux from a coil 11 surrounding the said lens parts.

As above indicated, the upper section 5 of the conduit is mounted to permit of slideable movement on the top surface 4 of the main chamber 7 for the purpose of bringing the electron beam on the axis $x$—$x$ of the instrument into register with the target toward which the electrons are directed. Such lateral movement is provided, in the instant case, by means of three set-screws 12, 13, 14, which are mounted 120° apart in threaded brackets 12', 13', 14' secured to the lower section 6 and which bear against the outer surface of the lens chamber or section 5. As previously brought out, if a conventional gasket-seal were to be employed for establishing a vacuum-tight seal between the contiguous end-faces 3 and 4 of the conduit the yieldable gasket material would distort and become wedged between said faces. Such wedging action would prevent further lateral movement of the conduit sections 5 and 6 and, if the applied force were great enough, would result in separation of the said sections.

The foregoing and other less apparent objections to yieldable gasket-type seals are obviated in accordance with the present invention by applying the lateral adjusting force to the gasket solely at a surface area thereon which is spaced from the contiguous faces of the parts which the gasket is designed to seal and by confining the resulting laterally-distorted portion of the gasket material to the area embraced by the groove in which the gasket is seated. To this end, the gasket, which here comprises a rubber or similar annulus 15 is contained in a groove 16 having an annular shoulder 17 which, as shown in Fig. 1, normally engages the gasket along a line which is spaced from the surfaces 3 and 4 which the gasket is designed to seal. Since it is only through this outer surface of the shoulder 17 that the lateral forces incident to the movement of the adjusting screws 12–14 are applied to the gasket, the resulting lateral distortion of the yieldable gasket material will be confined, substantially, to the area of the seal which lies below the level of the said shoulder. Thus, as shown in Fig. 3 when the upper portion of the gasket is urged to the left, the lower portion of the gasket will be constrained (by atmospheric pressure and by the weight of the part 5 thereon) to remain in contact with the surface 4. As a result, this yieldable material will stretch on both sides of the axis $x—x$, as indicated at 18 and 19, Fig. 3. This stretched material, however, is accommodated, on the left side of the said axis, beneath the shoulder 17 and, on the other or right side of the axis, within the space between the outer surface of the gasket and the adjacent surface of the groove. Thus, when the dimensions of the shouldered groove and of the gasket therein, are properly chosen there can be no wedging action such as would occur if the gasket seals of the prior art were to be subject to lateral distortion.

Without limiting the invention to a gasket seal of specific dimensions it may be well to set forth the exact dimensions employed in applying the invention to a so-called "table-model" electron-microscope. In the said practical embodiment of the invention the dimensions of the gasket were: 2.25″ inside diameter; 2.5″ outside diameter; thickness (uncompressed) .125″. This gasket was contained in a groove 0.110″ deep, having an outside diameter of 2.625″ and an inside diameter (adjacent to the shoulder 17) of 2.25″. The shoulder was .030″ above the end face (3) of the conduit and the area beneath the said shoulder was cut away substantially .060″. The gasket comprised an oil-resisting synthetic rubber (e. g. "neoprene") and was coated with a low-vapor grease or oil (e. g. "octoil").

It will now be apparent that the present invention provides an improved method of, and inexpensive apparatus for, maintaining a vacuum-tight seal in a vacuum system wherein the evacuable parts are mounted to permit of relative movement.

What we claim is:

A vacuum plumbing system comprising a conduit having a groove in an end face thereof, a second conduit having an end face presented in abutting relation to said grooved end face, means for relatively moving said conduits into and out of axial alignment, a yieldable gasket within said groove, said gasket being subject to lateral distorting forces in response to said relative movement of said conduits, and a shoulder within said groove for limiting the application of said lateral distorting forces to a portion of said yieldable gasket remote from the abutting faces of said conduits, said groove and said gasket being of annular configuration, the normal maximum external diameter of said yieldable annular gasket being substantially less than the external diameter of said annular groove whereby said annular groove is capable of accommodating said yieldable gasket material when said gasket is subjected to said lateral distorting forces.

GUSTAV F. BURGER.
JOHN H. REISNER.

References Cited in the file of this patent

UNITED STATES PATENTS

| Number | Name | Date |
|---|---|---|
| 294,562 | Baldwin | Mar. 4, 1884 |
| 1,581,973 | Meyer | Apr. 20, 1926 |
| 2,208,620 | Baisch | July 23, 1940 |
| 2,301,097 | Tweedale | Nov. 3, 1942 |